United States Patent [19]
Kubota

[11] Patent Number: 5,310,397
[45] Date of Patent: May 10, 1994

[54] COMPUTERIZED NUMERICAL CONTROL AUTOMATIC COMPLEX LATHE

[75] Inventor: Minoru Kubota, Narashino, Japan

[73] Assignee: Seiko Seiki Kabushiki Kaisha, Japan

[21] Appl. No.: 880,722

[22] Filed: May 8, 1992

[30] Foreign Application Priority Data

May 20, 1991 [JP] Japan .................. 3-114913

[51] Int. Cl.⁵ .......................... B23Q 3/157
[52] U.S. Cl. .......................... 483/18; 82/159;
483/20; 483/24; 483/27
[58] Field of Search ............... 29/28 C; 483/18, 27,
483/19, 20, 24, 14; 82/118, 159

[56] References Cited

U.S. PATENT DOCUMENTS

| | | | |
|---|---|---|---|
| 4,404,727 | 9/1983 | Zankl | 483/18 X |
| 4,646,422 | 3/1987 | McMurtry | 483/18 X |

FOREIGN PATENT DOCUMENTS

| | | |
|---|---|---|
| 0309951 | 4/1989 | European Pat. Off. |
| 3143409 | 5/1983 | Fed. Rep. of Germany |
| 3530982 | 3/1987 | Fed. Rep. of Germany |
| 3626324 | 2/1988 | Fed. Rep. of Germany |
| 0240201 | 9/1989 | Japan .................. 483/18 |

OTHER PUBLICATIONS

Patent Abstracts of Japan, vol. 11, No. 157 (M-590)(2604) May 21, 1987 & JP-A-61 288 963 (Mitsubishi Metal) Dec. 19, 1986.

Primary Examiner—Z. R. Bilinsky
Attorney, Agent, or Firm—Bruce L. Adams; Van C. Wilks

[57] ABSTRACT

A computerized numerical control automatic complex lathe has a main spindle for gripping and rotating a work to be machined. A first machining tool performs a main machining of the work. A turret tool rest has an outer peripheral surface for holding a set of secondary tools along the outer peripheral surface thereof. The turret tool rest is selectively indexable to bring a selected secondary machining tool into a position to effect a secondary machining of the work and is selectively movable relative to the work to enable the selected secondary machining tool to perform the secondary machining of the work. The turret tool rest further includes a plurality of tool holders for holding a plurality of secondary tools. A back spindle is disposable on a side of the work opposite the main spindle for holding a selected secondary machining tool selected from the plurality of secondary tools. The back spindle is selectively movable to enable the selected secondary machining tool to perform the secondary machining of the work.

8 Claims, 3 Drawing Sheets

COMPUTERIZED NUMERICAL CONTROL AUTOMATIC COMPLEX LATHE

BACKGROUND OF THE INVENTION

The present invention relates to a computerized numerical control automatic complex lathe having a main spindle and a back spindle. More particularly, the present invention relates to an improvement adapted to increase the number of work processes performed on the back spindle thereby enhancing the utility of back spindle.

A conventional computerized numerical control automatic complex lathe, having a main spindle and a back spindle is known. The main spindle is constructed to grip a rod-shaped work in a work chuck so that the work can be rotated and machined for machining it and rotating it. The back spindle is positioned on the side facing the main spindle via the work and in parallel to the main spindle. On the work side of back spindle is integrally fixed a machining chuck as a back spindle tool.

The above-described computerized numerical control automatic complex lathe is so constructed that a rod-shaped work gripped in the machining chuck on the main spindle is machined with a cutting tool for main machining or a machining tool on a turret tool rest, and after the work is regripped in the work chuck on the back spindle, the work is machined with a machining tool as described above while being gripped in this chuck.

With the above-described conventional computerized numerical control automatic complex lathe, it is impossible to change the chuck on the work back spindle without stopping the machine. Also during cutting, only one kind of work that matches the chuck can be gripped. Also, a tool other than a chuck, for example a drill, cannot be mounted on the back spindle. Therefore, the work process which can be performed by the back spindle is limited to gripping only one kind of work.

SUMMARY OF THE INVENTION

It is an object of the present invention to provide a computerized numerical control automatic complex lathe with improved back spindle to perform a complex machining processes.

In the numerical control automatic complex lathe of the present invention, the number of machining process which can be performed on the back spindle is increased by constructing the machine in such a manner that the back spindle tool can be changed. To attain the above object, the present invention provides a chuck mounted for clamping and unclamping a back spindle tool. The chuck is mounted on the work side of the back spindle on a computerized numerical control automatic complex lathe. The lathe has a main spindle for holding and rotating a work and a back spindle positioned at the side facing the main spindle via the work and in parallel to the main spindle. The work may be machined with a cutting tool for main machining and also by a machining tool on a turret tool rest.

Another object of the present invention is a tool holder for holding back spindle tools. The tool holder is mounted on the turret tool rest.

A further object of the present invention is to provide a back spindle tool comprising a tool for machining a work and a work chuck for gripping the work.

According to the present invention, the back spindle tool chuck can clamp not only a plurality of kinds of works but also a tool such as a drill.

DETAILED DESCRIPTION OF THE PREFERRED EMBODIMENTS

Figure 2:
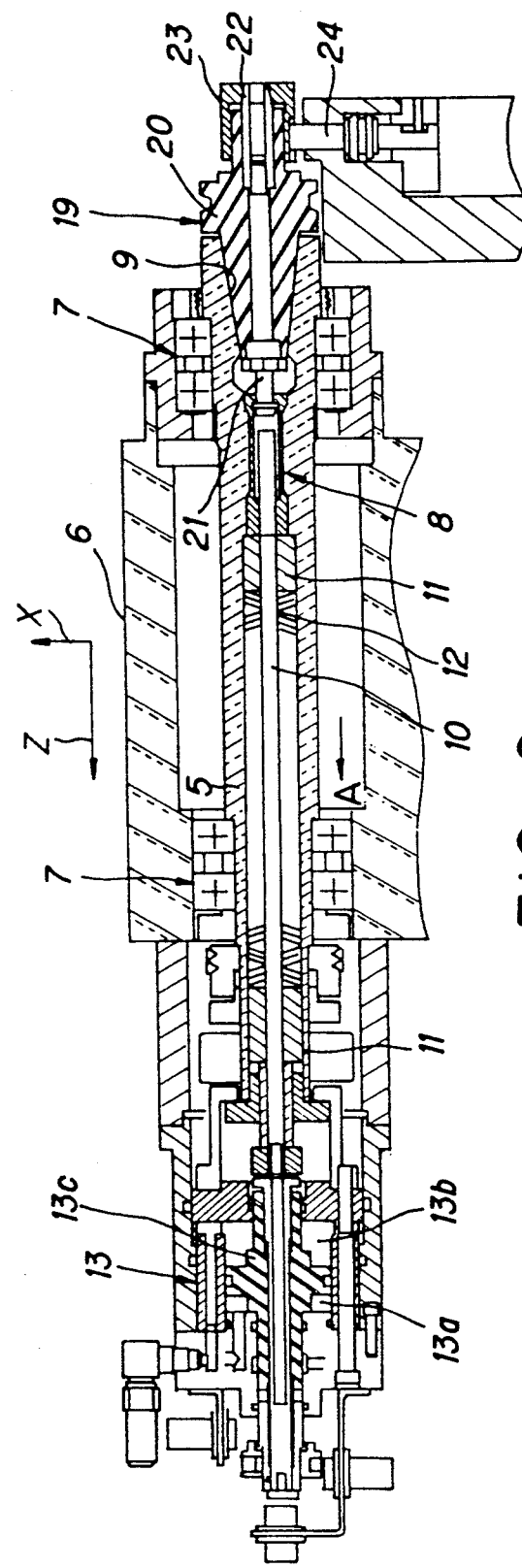
FIG. 2 is a sectional view of a back spindle having a chuck of the present invention.
Figure 3B:
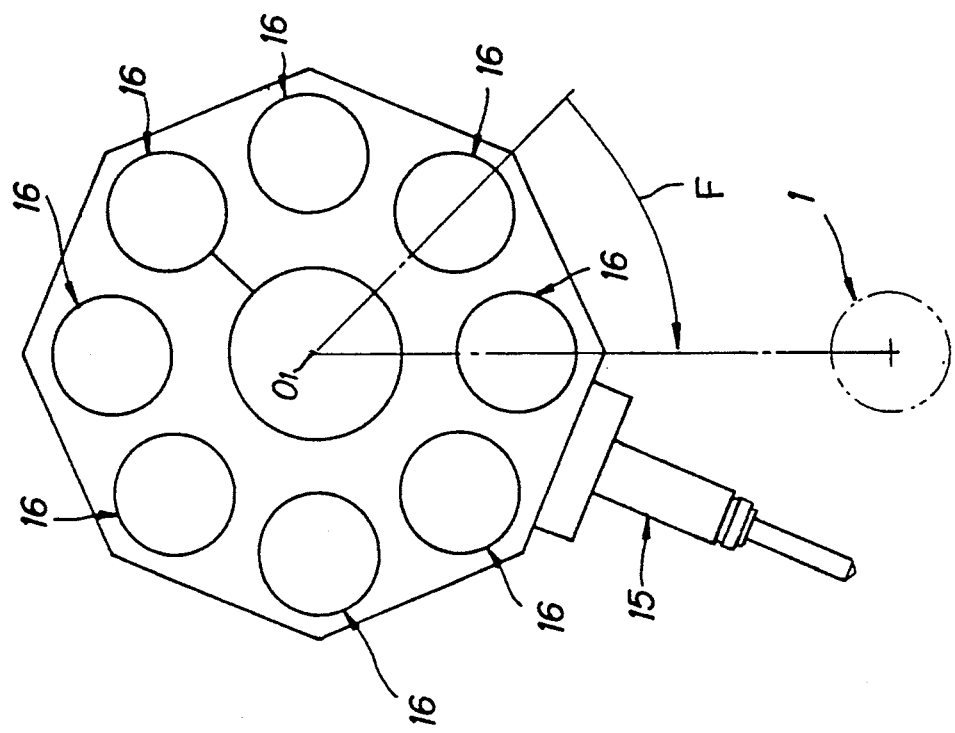
FIGS. 3 and 3B are a view of a turret tool holder viewed in the direction of the arrow A in FIG. 1.

An embodiment of a computerized numerical control automatic complex lathe according to this invention will be described with reference to FIGS. 1 through 3.

Figure 1:
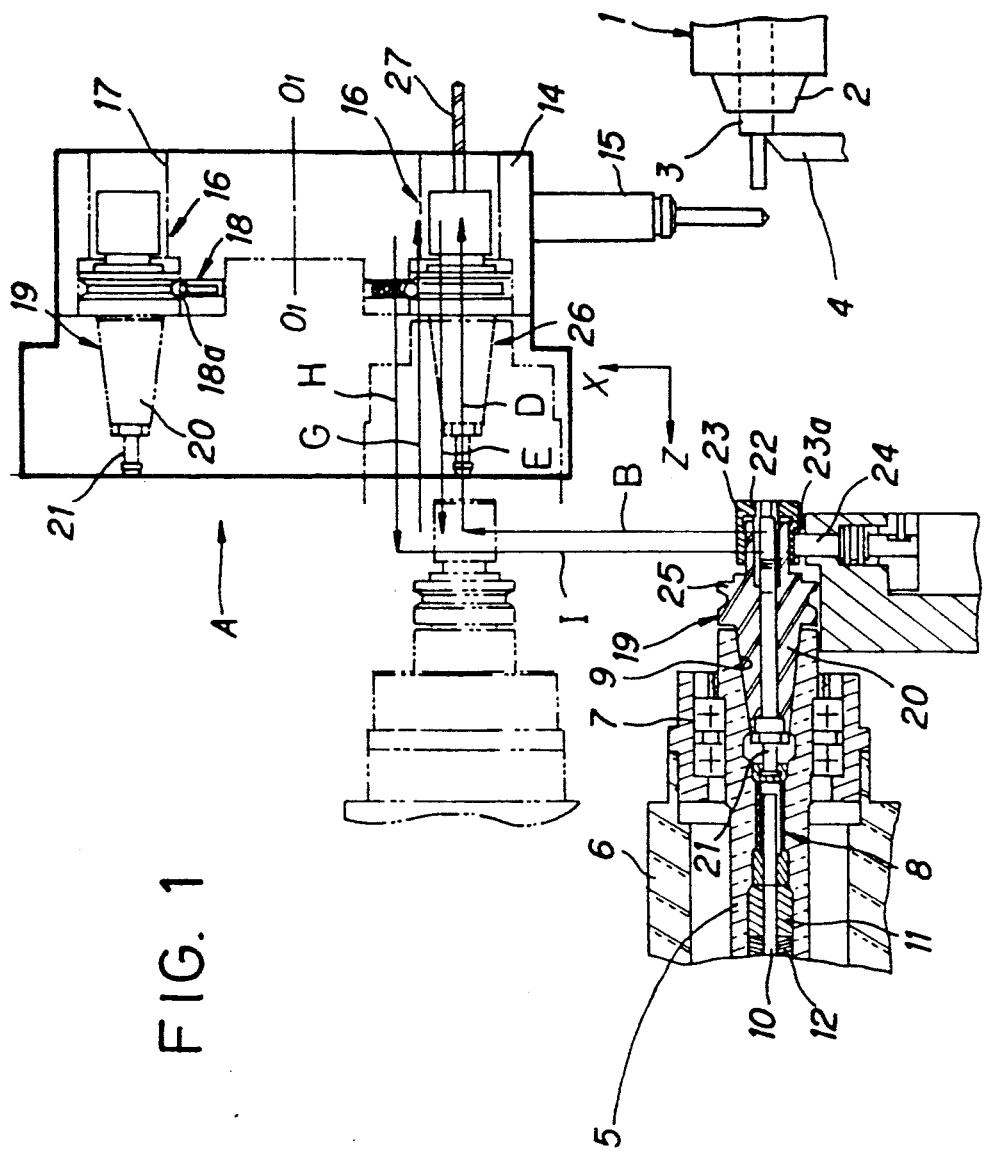
FIG. 1 a plan view illustrating a main portion of a computerized numerical control automatic complex lathe of the present invention.

On this computerized numerical control automatic complex lathe, as shown in FIG. 1, a main spindle 1 is mounted on a base (not shown). The main spindle 1 is supported in such a manner that it can be rotated with its axis being the center and can be moved back and forth along the coordinate axis Z.

The main spindle 1 is formed in a cylindrical shape, and a chuck 2 for gripping a work is attached to one end of the main spindle. The chuck 2 is constructed to grip a rod-shaped work 3. The work 3 is fed from the inside of main spindle 1 toward the chuck 2 by a specified amount, following the advance of main spindle 1 toward a cutting tool 4 (a cutter for main machining) along the coordinate axis Z. The cutting tool 4 is mounted in such a manner that it can move back and forth along the coordinate axis X.

On the side facing the main spindle 1 via the work 3, a back spindle 5 is mounted in parallel to the main spindle. The back spindle 5 is supported at both end portions by bearings 7, 7 (shown in FIG. 2) within a back head stock 6 and can be moved back and forth along the coordinate axes Z and X together with the back head stock 6.

The back spindle 5 is formed in a cylindrical shape, and incorporates a collet chuck 8 for gripping a tool. The collet chuck 8 is located on the side of work 3 of the back spindle 5. On the tip side of the collect chuck 8, the inner surface of the back spindle 5 is formed into a conical shape as a guide passage 9 for a conical holder 20 on a later described back spindle tool 19.

The collet chuck 8 is attached to one end of a rod 10. This rod 10 is supported by two guide bushes 11 and can be moved on the inside of the back spindle 5. The rod 10 is pushed toward the other end of the back spindle 5 (indicated by the arrow A in FIG. 2) by a belleville spring 12. In this pushed condition, the collet chuck 8 is closed and clamps the chucked portion 21 of the conical holder 20.

At the other end of the rod 10, a hydraulic actuator 13 is positioned. The hydraulic actuator 13 is constructed in such a manner that the tip of a piston 13c presses the other end of the rod 10 by supplying oil into a pressure oil chamber 13a while draining oil from a pressure oil chamber 13b. When the rod 10 is pressed, the rod moves against the force of the belleville spring 12. Then, the collet chuck 8 protrudes into the guide passage 9 and opens to unclamp the chucked portion 21 of the conical holder 20.

As shown in FIG. 1, a turret tool rest 14 is positioned in a position facing the cutting tool 4 via the work 3.

The tool rest 14 is installed in such a manner that its axis of rotation $O_1$ is in parallel to the axis of the main spindle 1 and it can be moved back and forth along the coordinate axes Z and X.

On the peripheral surface of the tool rest 14, a cutting tool 15 is mounted. The tool rest 14 has a set of secondary tools radially extending from the outer periphery. thereof. The tool rest 14 can be equipped with the set of secondary tools having a total of eight cutting tools 15 radially extending from its axis of rotation $O_1$ when being fully equipped. In FIG. 1, one tool, a drill, among the eight cutting tools is shown as an example, and other seven tools are not shown.

On the surface side of the tool rest 14, eight tool holders 16 are disposed radially from the axis of rotation $O_1$ (refer to FIG. 3A) for holding a plurality of secondary tools. A tool holder 16 is composed of a through hole 17 and three click stoppers 18 to hold a back spindle tool 19. The through hole 17 extends through the tool rest 14. A click stopper 18 is installed in such manner that a small-diameter ball 18a protrudes toward the hole 17.

The back spindle tool 19 has a conical holder 20. The top of the holder 20 is integrally attached to a chucked portion 21. The bottom of the holder 20 is integrally attached a collet chuck 22 for gripping a work. The collet chuck 22 is covered by a hollow screw 23 so that only its tip is exposed to the outside.

The collet chuck 22 is so constructed that when a rod 24 abuts on the flat recessed portion 23a on the periphery surface of the hollow screw 23, and the back spindle 5 is turned in the forward or reverse direction, the hollow screw 23 moves longitudinally, resulting in a clamping or unclamping condition. The rod 24 is mounted on a base (not shown).

On the bottom of the conical holder 20, an annular groove 25 is formed, with which the small-diameter ball 18a of the chick stopper 18 engages.

Although eight tool holders 16 hold back spindle tools (the plurality of secondary tools) each having a chuck of a kind different from the collet chuck 22, their descriptions and drawings are omitted because the constitution is basically equal to that of the above-described back spindle tool. Besides these tools, the back spindle tool 26 includes a drill 27, or other tools, which is attached to the same portion as that of the collet chuck 22.

Next, the operations of the main potions of the computerized numerical control automatic complex lathe constituted as described above will be described with reference to FIG. 1.

According to this computerized numerical control automatic complex lathe, in order to change the tool 19 now clamped with the chuck 8 of the back spindle 5, the back spindle 5, together with the back head stock 6, is advanced toward the tool rest 14 along the coordinate axis X (indicated by the arrow B in FIG. 1). When the tool 19 reaches a position where it can face any one of the tool holders 16 on the tool rest 14, the advance of the back spindle 5 stops.

Figure 3A:
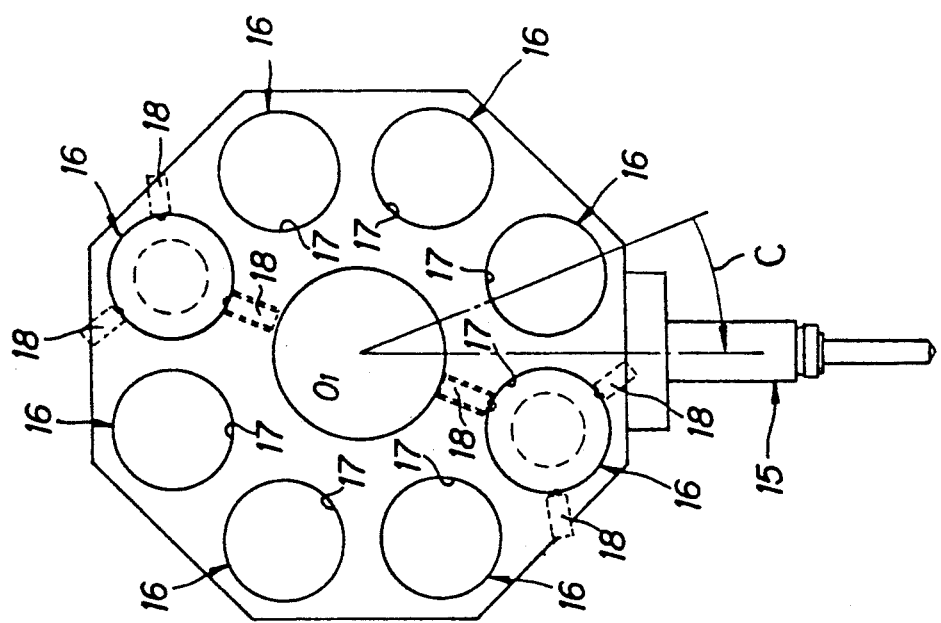

Then, the tool rest 14 is rotated around the axis of rotation $O_1$ (indicated by the arrow C in FIG. 3A). When, by this rotation, the tool 19 faces the tool holder 16 in which the tool 19 was held or any other empty tool holder 16, the rotation of the tool rest 14 stops.

Next, the back spindle 5, together with the back head stock 6, advances toward the tool holder 16 along the coordinate axis Z (indicated by the arrow D in FIG. 1.) When the groove 25 of the holder 20 engages with the small-diameter ball 18a of the click stopper 18, the advance of the back spindle 5 stops.

At this time, oil is supplied to one pressure oil chamber 13a of the hydraulic actuator 13 and the oil in the other pressure oil chamber 13b is drained. As a result, the tip of a piston 13c presses the other end of the rod 10, so that the rod 10 removes against the force of the belleville spring 12. Thus, the collet chuck 8 protrudes into the guide passage 9 and opens to unclamp the chucked portion 21 of the conical holder 20.

After the back spindle 5, together with the back head stock 6, retracts in the direction of the arrow E in FIG. 1 along the coordinate axis Z while the chuck 8 is empty as described above, the tool rest 14 is rotated around the axis of rotation $O_1$ (indicated by the arrow F in FIG. 3A). When, by this rotation, the back spindle tool 26 having a tool to be used in the next process, for example a drill 27, faces the chuck 8 of the back spindle 5, the rotation of the tool rest 14 stops.

Then, the back spindle 5, together with the back head stock 6, advances again along the coordinate axis Z (indicated by the arrow G in FIG. 1) until the empty chuck 8 abuts on the chucked portion 21 of the holder 20, where the advance of the back spindle 14 stops.

From this time, oil is drained from one pressure oil chamber 13a of the hydraulic actuator 13 and oil is supplied to the other pressure oil chamber 13b. As a result, the piston 13c returns to its original position, and the rod 10 is pressed back by the resilient force of belleville spring 12. Thus, the rod 10 is kept pushing by the belleville spring 12, and the chuck 8 closes to clamp the chucked portion 21 of the holder 20.

After the back spindle 5, together with the back head stock 6, retracts in the direction of the arrow H in FIG. 1 along the coordinate axis X, it returns to its original position. Thus, the drill 27 is mounted on the back spindle 5 as a tool to be used in the next process.

Since each tool holder 16 contains a back spindle tool having a different kind of chuck for gripping a work, such kind of chuck for gripping a work other than a drill or other tools can be mounted on the back spindle 5 when the above-described operation is performed repeatedly.

Therefore, according to the above embodiment, a plurality of kinds of chucks for gripping a work and a drill or other tools can be mounted on the back spindle, so that the number of work processes which can be performed on the back spindle, for example the holder of a work with the chuck or the front machining of a work with a drill can be realized. Therefore, the embodiment enhances the utility of the back spindle and meets the requirement for the production of multi-product small-volume parts.

In the above, embodiment, since the turret tool rest is equipped with tool holders for holding the back spindle tools (the plurality of secondary tools), a mounting area dedicated to the tool holders is not needed on the machine, which makes the entire machine more compact.

With the computerized numerical control automatic complex lathe according to the present invention, a plurality of kinds of chucks for gripping a work and a drill or other tools can be mounted on the back spindle since the chuck for tool for clamping and unclamping the back spindle tool is mounted on the work side of the back spindle as described above. Therefore, the number of work processes which can be performed on the back spindle, for example, the holding of a work with the chuck or the front machining of a work with a drill can be realized.

Moreover, the turret tool rest is equipped with tool holders for holding the back spindle tool, so a mounting area dedicated to the tool holders is not needed on the machine, which makes the entire machine compact.

What is claimed is:

1. A computerized numerical control automatic complex lathe comprising:
    a main spindle for gripping and rotating a work to be machined;
    a back spindle positioned on the opposite side of the work and facing the main spindle;
    a first machining tool for performing a main machining of the work;
    a second machining tool selected from a plurality of machining tools and chucked by the back spindle for performing a secondary machining of the work; and
    a turret tool rest having at least one tool holder for holding one of the plurality of machining tools which are utilized for the secondary machining of the work, the turret tool rest further having a set of machining tools radially extending from the outer periphery thereof.

2. A computerized numerical control automatic complex lathe according to claim 1; wherein the turret tool rest includes a plurality of tool holders each holding a respective one of the plurality of machining tools which are utilized for the secondary machining of the work.

3. A computerized numerical control automatic complex lathe according to claim 1; wherein the plurality of second machining tools includes a chuck for gripping the work.

4. A computerized numerical control automatic complex lathe, comprising: a main spindle for gripping and rotating a work to be machined; a first machining tool for performing a main machining of the work; a turret tool rest having at least one tool holder for holding at least one of a plurality of secondary tools, the turret tool rest also having a set of secondary tools radially extending from the outer periphery thereof; and a back spindle disposable on a side of the work opposite the main spindle for holding a selected one of the plurality of secondary machining tools and selectively movable relative to the work to enable the selected secondary machining tool of the plurality of secondary machining tools to perform the secondary machining of the work.

5. A computerized numerical control automatic complex lathe according to claim 4; wherein the plurality of secondary tools includes a chuck for gripping the work.

6. A computerized numerical control automatic complex lathe according to claim 4; wherein the back spindle has a collet chuck; the turret tool rest has a plurality of tool holders and a body rotatable about a central axis, the plurality of tool holders comprising a plurality of through holes circumferentially disposed about the central axis in the body for holding respective ones of the plurality of secondary tools, the turret tool rest being selectively rotatable about the central axis to bring a tool holder holding a selected secondary tool of the plurality of secondary tools to a position effective to be received by the collet chuck of the back spindle; and the back spindle being movable relative to the turret tool rest to a position to receive the selected secondary tool of the plurality of secondary tools.

7. A computerized numerical control automatic complex lathe according to claim 6; wherein the back spindle has an automatic collet chuck for receiving the selected secondary tool.

8. A computerized numerical control automatic complex lathe according to claim 4; including means mounting the turret tool rest to be selectively indexable to bring a selected one of the set of secondary machining tools into a position to effect a secondary machining of the work and to be selectively movable relative to the work to enable the selected secondary machining tool of the set of secondary machining tools to perform the secondary machining of the work.

* * * * *